& nbsp;

2,796,449

PROCESS OF PRODUCING FOAMED RUBBER LATEX PRODUCTS

Albert Edward Toney Neale, Erdington, Birmingham, and John Fishbein, Birmingham, England, assignors to Dunlop Tire and Rubber Corporation, Buffalo, N. Y., a corporation of New York No Drawing. Application July 7, 1953, Serial No. 366,614

11 Claims. (Cl. 260—723)

This invention relates to the manufacture of sponge rubber articles from foamed rubber latex.

In the manufacture of rubber articles from unfoamed rubber latex it is known that gelling of the latex can be brought about by the addition of phenol in conjunction with aldehydes. However, it has been observed that if in the absence of a delayed action gelling agent which lowers the pH value, phenols are added to foamed rubber latex, even in the presence of zinc oxide, the structure of the resulting foamed product is subject to severe splitting.

When foamed natural rubber latex is used for the manufacture of sponge rubber articles, it is usual to compound the latex with zinc oxide and to gel the foam by means of a delayed-action gelling agent. It is well known that the proportions of zinc oxide and gelling agent which are required to produce the most suitable gelling time will vary with each consignment of latex and will also depend to some extent on the conditions under which the process is carried out. It is usual, therefore, to test the latex by adding various amounts of zinc oxide and gelling agent at about the temperature at which the latex is to be processed and to select the proportions which give a gelling time suitable for the process under consideration.

In one method of carrying out such a test, for example, part of the zinc oxide is matured with the latex for a period of 1 to 3 days, a soap is then added, the latex is whipped and the remainder of the zinc oxide is added; shortly before the end of the whipping period a delayed-action gelling agent, such as sodium silicofluoride, is added. The time required for a sample of the foam to gel is then observed and, if necessary, the test is repeated with various amounts of zinc oxide and gelling agent until the proportions which yield a suitable gelling time for the process contemplated are determined.

When the optimum proportions of the ingredients and the conditions of gelling have been determined for a given latex the gelling pH value of the system can be ascertained by measuring the pH value of the latex immediately prior to gelling. This can conveniently be carried out using a glass electrode.

We have now found that products having an improved internal structure are obtained if the gelling is carried out in the presence of an organic hydroxy compound which causes the gelling pH to increase by about 0.3 pH unit or more.

According to our invention, therefore, a process for the manufacture of sponge rubber articles from foamed rubber latex containing zinc oxide and a delayed-action gelling agent comprises gelling the latex in the presence of an organic hydroxy compound in an amount producing an increase in the gelling pH value of the system which is of the order of 0.3 pH unit or more.

The preferred hydroxy compounds are those which increase the gelling pH by at least 0.4 unit. The amount of the compound used may be up to 5 percent of the dry weight of rubber present in the system but is preferably between 0.5 and 2 percent. The degree to which the pH value is raised can often be controlled to some extent by varying the proportions of the hydroxy compound. The compounds which have been found to be most advantageous are the monohydroxy aryl compounds containing the hydroxyl group in the aryl nucleus. Suitable compounds of this type include monohydric phenols, such as phenol and the cresols, and monohydric naphthols, particularly alpha-naphthol and beta-naphthol. Substituted phenols and naphthols may also be used, e. g. p-nitroso-phenol, 2-naphthol-1-sulphonic acid and 2-naphthol-3-sulphonic acid. Other hydroxy compounds which have been found suitable are methyl cyclohexanol and hydroquinone. It is thought that many of the compounds used possess the power of decreasing the mechanical stability of the foamed latex prior to gelling, in addition to increasing the gelling pH value.

Latices which have been electro-decanted or preserved with sodium or ammonium pentachlorphenate do not generally yield good gelled foam structures, when gelled in the usual manner with a gelling agent such as sodium silicofluoride, owing to the breakdown of the foam which occurs, but it has now been found that addition of organic hydroxy compounds in accordance with this invention to such latices produces greatly improved products having good structures. In the case of electro-decanted latex the improvement is such that it is possible to produce cellular rubbers of very light density which are usually difficult to manufacture even with normal latex. When alpha- or beta-naphthol is added to such latex in accordance with the invention the gelling pH is raised to about 9, instead of the usual value of 8.2–8.3.

The invention is illustrated by the following examples in which all parts are given by weight and all percentage proportions are based on the weight of dry rubber present.

*Example I*

An electro-decanted latex was compounded with the usual vulcanising ingredients and matured for a period of 1 to 3 days with a mixture of zinc diethyl dithiocarbamate, mercaptobenzthiazole and a water-soluble soap. After maturing, a further amount of soap was added together with 2 percent of alpha-naphthol and the mixture was frothed up to about four-fifths of the final volume. 3 percent of zinc oxide in the form of an aqueous dispersion was then added, the mixture was frothed up to its final volume and 0.8 percent of sodium silicofluoride added to produce gelling. When gelled and vulcanised, the final product possessed a good structure free from breakdown or splitting of the foam. The gelling pH value of the foam, measured with a glass electrode immediately prior to gelling was 9.0. When the process was carried out without the addition of alpha-naphthol the foamed latex had a very poor, coarse structure and the gelling pH value was 8.25.

*Example II*

A latex preserved with sodium pentachlorphenate was compounded as in Example I except that the proportion of sodium silicofluoride was reduced to 0.6 percent and the alpha-naphthol was replaced by 1 percent of beta-naphthol. The gelling pH value of the foam was 8.9. The resulting gelled and vulcanised product possessed an excellent structure which was not obtained when the beta-naphthol was omitted. In the latter case the gelling pH value was 8.3.

*Example III*

An electro-decanted natural rubber latex as used in Example I was compounded, gelled and vulcanised in a similar manner, except that the alpha-naphthol was replaced by 2 percent of cyclohexanol. The gelling pH value of the foam was 8.4 and the final product possessed a good structure. In the absence of cyclohexanol the gelling pH value was 8.1 and the product possessed a poor structure.

Having now described our invention what we claim is:

1. A process for the manufacture of sponge rubber articles from rubber latex containing zinc oxide and a delayed action gelling agent which gels the latex at atmospheric temperature which comprises beating said latex to a foam, gelling the latex in the presence of a compound selected from the group consisting of cyclohexanol and mono-hydroxy-substituted aromatic hydrocarbons having the hydroxyl group directly attached to a carbon atom of an aromatic nucleus in an amount producing an increase in the gelling pH of the system of not substantially less than 0.3.

2. A process according to claim 1 wherein the increase in the gelling pH is greater than 0.4 pH unit.

3. A process according to claim 1 wherein the amount of the said compound is in a substantial amount up to 5 percent of the dry weight of rubber present.

4. A process according to claim 3 wherein the amount of the said compound is from 0.5 percent to 2 percent of the dry weight of rubber present.

5. A process according to claim 1 wherein the said compound is a monohydroxy aryl compound containing the hydroxyl group in the aryl nucleus.

6. A process according to claim 5 wherein the said compound is phenol.

7. A process according to claim 5 wherein the said compound is a monohydroxy naphthol.

8. A process according to claim 1 wherein the rubber latex is an electro-decanted natural rubber latex.

9. A process according to claim 1 wherein the delayed-action gelling agent is sodium silicofluoride.

10. A process for the manufacture of sponge rubber articles from rubber latex which comprises maturing said latex with vulcanization accelerators, adding between one and two percent of naphthol, beating said latex to a froth, adding three percent of zinc oxide in aqueous dispersion to said beaten froth, further beating said froth to a greater volume, adding 0.8 percent of sodium silicofluoride, gelling and vulcanizing said foamed latex.

11. The process of claim 10 in which cyclohexanol is substituted for the naphthol.

References Cited in the file of this patent

UNITED STATES PATENTS

| | | |
|---|---|---|
| 1,259,793 | Slocum | Mar. 19, 1918 |
| 1,380,640 | Davidson | June 7, 1921 |
| 1,381,455 | Davidson | June 14, 1921 |
| 2,261,439 | Kelly | Nov. 4, 1941 |
| 2,469,894 | Rogers | May 10, 1949 |
| 2,568,457 | Meyer | Sept. 18, 1951 |

OTHER REFERENCES

Noble: "Latex in Industry," 2nd edition, pages 283 and 606. Copyright 1953.